Aug. 16, 1949.  W. H. HIGHFIELD ET AL  2,479,008
RETOUCHING AND VIEWING DESK
Filed Nov. 25, 1947  3 Sheets-Sheet 1
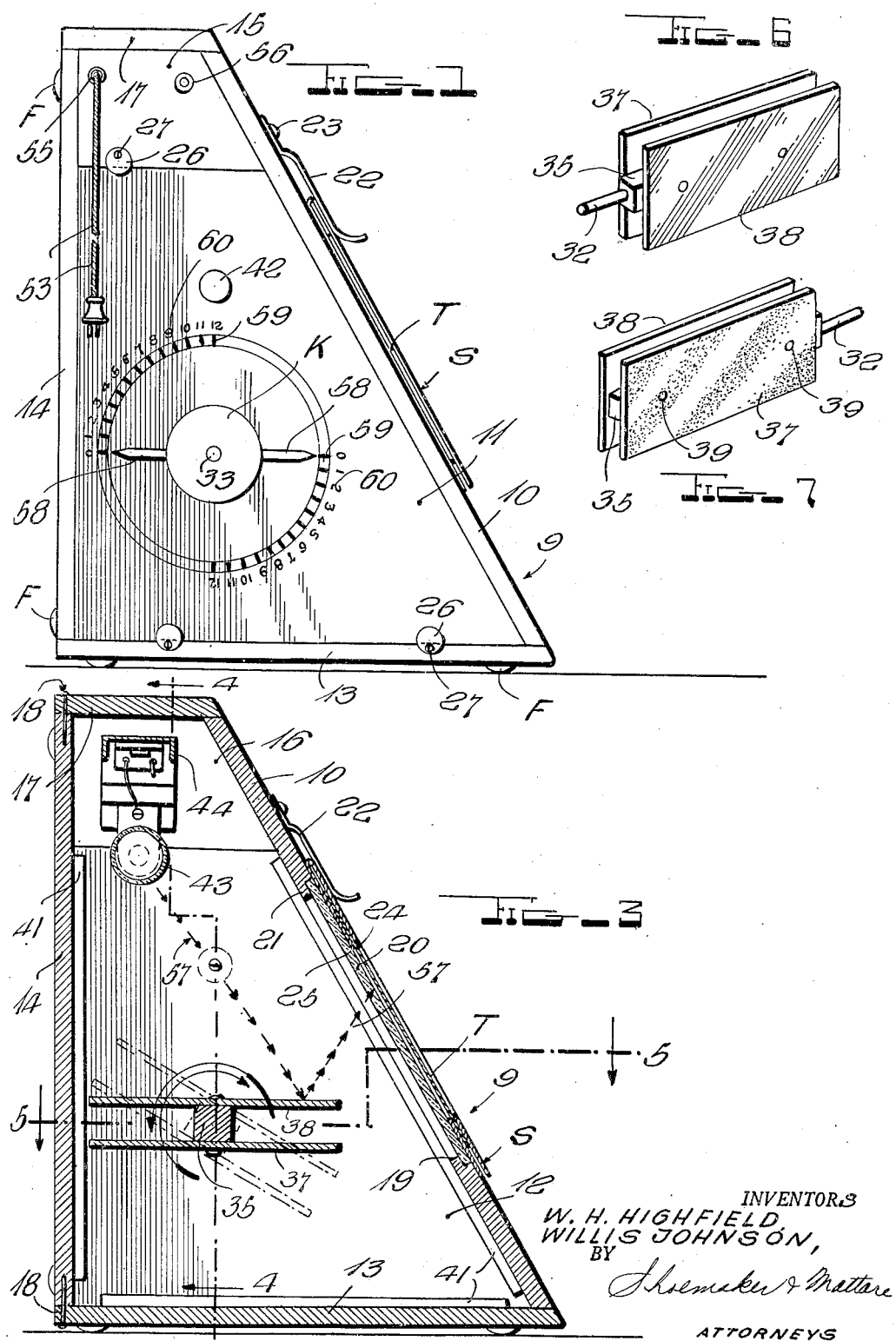
INVENTORS
W. H. HIGHFIELD
WILLIS JOHNSON,
BY
Shoemaker & Mattare
ATTORNEYS

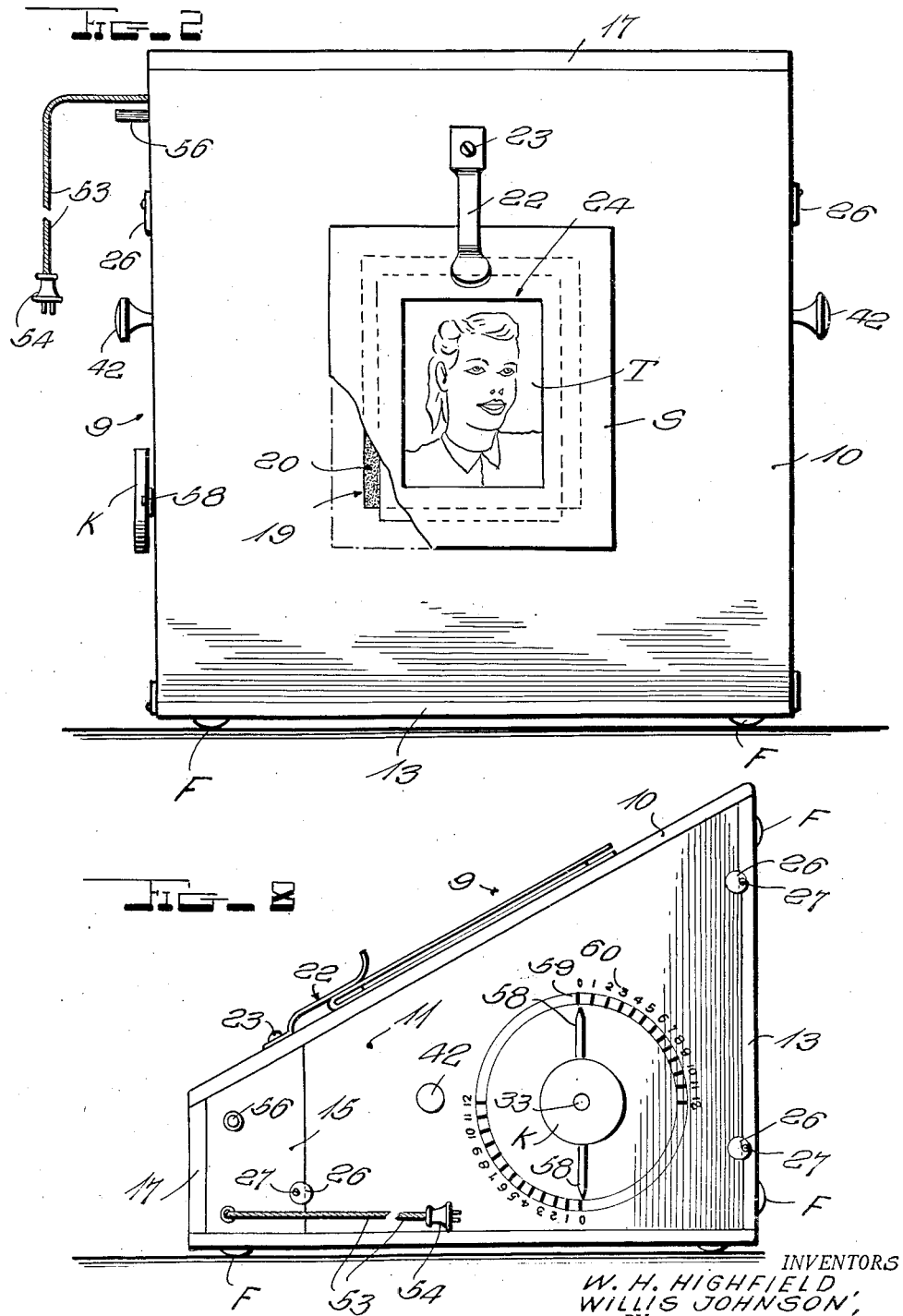

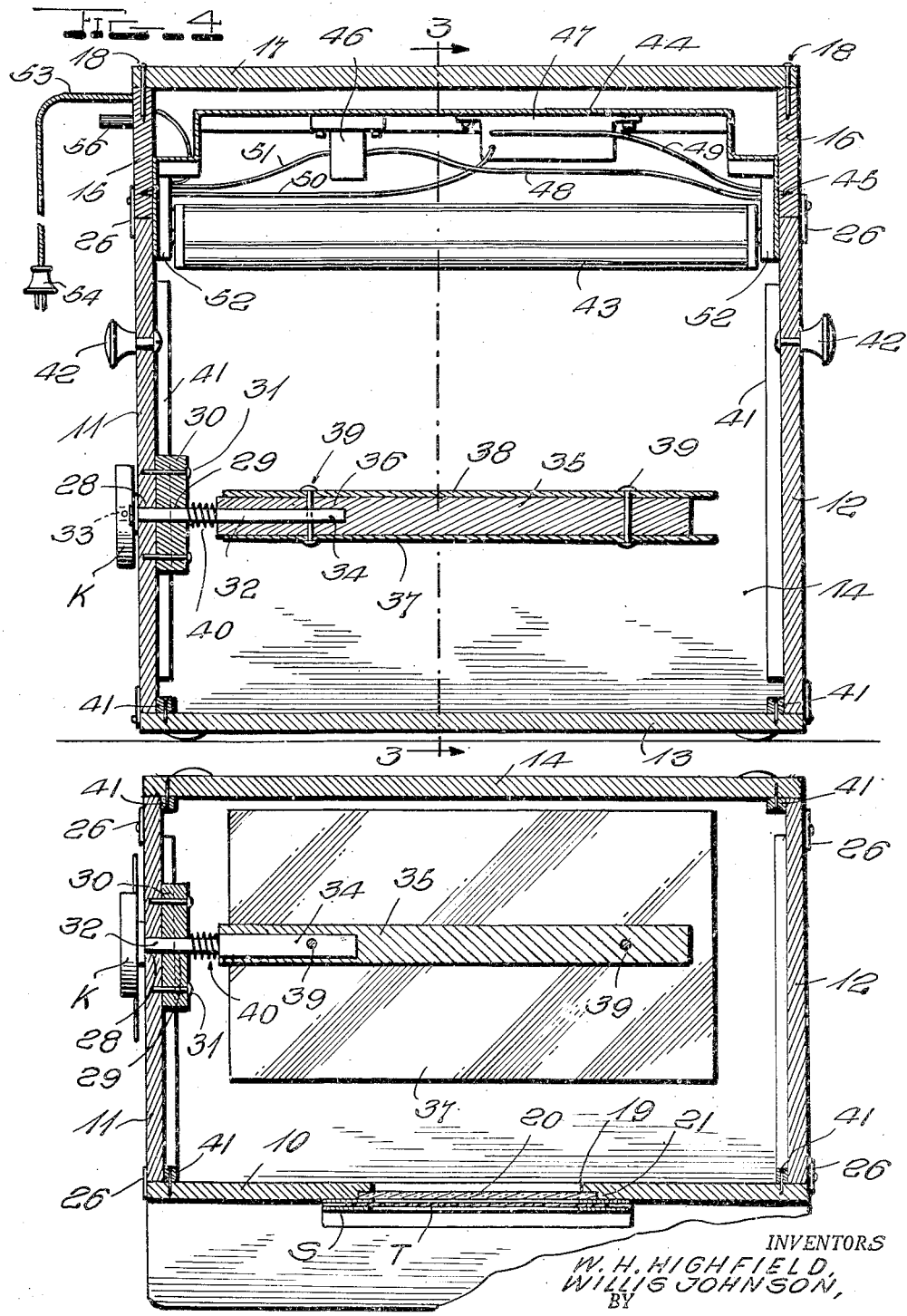

Patented Aug. 16, 1949

2,479,008

UNITED STATES PATENT OFFICE 2,479,008

RETOUCHING AND VIEWING DESK

William H. Highfield, Washington, D. C., and Willis D. Johnson, Fayette City, Pa.

Application November 25, 1947, Serial No. 787,944

7 Claims. (Cl. 95—102)

This invention relates to retouching and viewing desks.

The present retouching and viewing desk is such that it will enable the retoucher or viewer of a transparency of most any kind to more accurately determine the retouching of a film or the like that is necessary, or, when viewing a transparency, to better enable the viewer to see imperfections needing alterations or corrections in such a transparency.

The desk is particularly adaptable for retouching photographic films.

In the past, desks for viewing and/or retouching have been provided with a viewing window of ground glass and a source of light is placed behind this glass for illuminating a film or other transparency disposed over the glass. In some instances a reflector of some sort is placed at some stationary position in the rear of the ground glass. The source of light for purposes of illuminating the ground glass and the film or other transparency to be viewed or retouched is constant in these prior retouching and viewing desks.

Under such circumstances, in using the prior retouching and viewing desks, the operator is working in a room where the source of illumination of the desk is constant and the source of illumination of the room itself, whether it be natural daylight with or without artificial light of any kind, varies. Thus the operator is considerably handicapped in accurately viewing or retouching transparencies under such circumstances. When this procedure is followed for some time, the operator is subjected to serious eye strain, in some instances permanent impairment of the eyesight, which is usually progressive and not at once known to the operator. In any event, the operator is working under very unsatisfactory conditions and with apparatus that does not permit of accurate and proper viewing of the film to be retouched, and the retouching operation, therefore, depends considerably upon the skill of the retoucher.

In our retouching and viewing desk we have provided an enclosed structure for the source of illumination and in addition have provided an adjustable multi-faced reflector which directs the proper amount of reflected light under any and all operating conditions to a ground glass or other similar surface in one wall of the desk.

By having the reflecting media within the desk and in the rear of the ground glass or like surface in one wall of the desk and providing a constant source of illumination within the desk, the operator, by simply turning a knob which changes the position of the reflector with respect to the source of illumination and the rear side of the ground glass or the like, is thereby enabled to effect direction of the reflected light within the desk against the rear surface of the ground glass or the like in such an amount or intensity that under any and all operating circumstances and conditions the proper amount of light on the rear of the ground glass is present and this reflected light can be changed in a moment by simply rotating a knob exteriorly of the desk and which knob controls directly the movement of the multi-faced reflecting media within the desk.

Our retouching and viewing desk will enable experienced and other operators to utilize the same without producing eye strain or causing impairment of the eyesight in the retouching of photographic films or viewing transparencies, or retouching or reworking or altering any and all transparencies, such as maps, etc. The speed of work by the operator is increased about 300%, as proved by actual tests. Then, too, the number of test strips necessary to evaluate results is reduced to a minimum, thereby effecting a great saving in time and materials.

Further, in teaching a beginner the art of retouching photographic films or similar transparencies, a great deal of difficulty is encountered in getting the beginner to look at the film or other transparency rather than to look through the same. With the readily adjustable reflector within our desk, the proper amount of light is reflected to the rear of the ground glass or the like and this enables the operator to concentrate on the particular area to which the proper intensity of reflected light is directed on the film or other transparency which is on the front side of the ground glass and thus he is able to concentrate on the particular area rather than look through the same.

Further, in retouching photographic film or other transparencies the undesirable densities and contrasts are more easily recognized and evaluated as the operator is able to study the different areas under varying degrees of illumination produced by the adjustability of the multi-faced reflecting media within our desk.

With the foregoing in mind, it is an object of our invention to provide a retouching and viewing desk which includes a source of illumination and a readily adjustable reflector to receive the rays of light from the source of illumination and direct such rays of light to the rear surface of the ground glass or the like in one wall of the desk.

Another object of our invention is to provide in combination in an enclosed retouching and viewing desk a source of light and a readily adjustable reflecting media for directing reflected rays of light from a suitable source to the rear surface of a semi-transparent panel in one wall of the desk.

Another object of the invention is to provide a retouching and viewing desk including a constant source of light and a readily adjustable reflecting media therein for reflecting rays of light to a semi-transparent panel in the desk.

Another object of the invention is to provide in combination an illuminated retouching and viewing desk and a rotatable multi-faced reflecting media therein for reflecting light to the rear surface of a semi-transparent panel in one wall of the desk.

Another object of the invention is to provide a retouching and viewing desk wherein a reflected light source is variably directed to the rear portion of a translucent panel in one wall of the desk.

Another object of the invention is to provide a retouching desk including in combination a source of light and a multi-faced rotatable reflecting media.

Another object of the invention is to provide a retouching and viewing desk of simple construction, yet durable, and effective as regards the proper variable illumination of a semi-transparent panel in one wall of the desk.

With the above and other objects in view, the invention consists in the construction and novel combination and arrangement of parts hereinafter fully described, illustrated in the accompanying drawings and pointed out in the claims hereto appended; it being understood that various changes in the form, proportions, and minor details of construction, within the scope of the claims, may be resorted to without departing from the spirit or sacrificing any of the advantages of the invention.

In the drawings:

Figure 1 is a side elevational view of our retouching and viewing desk;

Figure 2 is a front elevational view of the desk;

Figure 3 is a transverse vertical sectional view on the line 3—3 of Figure 4;

Figure 4 is a longitudinal vertical sectional view on the line 4—4 of Figure 3;

Figure 5 is a horizontal sectional view substantially on the line 5—5 of Figure 3;

Figure 6 is a perspective view of the multi-faced reflector showing the shaft for mounting the same in the desk;

Figure 7 is a view similar to Figure 6 but with the reflector being reversed and showing the shaft at the opposite end thereof; and Figure 8 is a side elevational view similar to Figure 1, but showing the desk with the top thereof in a different angular disposition from that of Figure 1.

The invention will be more readily understood by referring to the drawings in detail wherein like reference numerals in the several figures of the drawings denote the same parts.

The retouching and viewing desk is denoted generally at 9 and in cross section is of somewhat distorted triangular shape and includes a front wall 10 and removable side walls 11 and 12 and an alternate bottom and rear wall 13 and an alternate bottom and rear wall 14. The respective side walls 11 and 12 are removable and there are provided fixed partial side walls 15 and 16. The desk is also provided with a wall 17 which alternately serves as a top and a front, depending on whether the desk is used in its 60° inclination or its 45° inclination, Figure 1 and Figure 8, respectively, as will be more fully explained hereinafter.

From the above it is clear that the desk is completely enclosed in the form of a cabinet and that the front wall 10 is disposed at a rather acute angle as regards the wall 14, thus producing the substantially triangular outline of the desk in cross section and resulting in the fixed inclination of the front wall 10. The several walls 10, 13, 14 and 15 and 16, and the top wall 17 are held together by means of screws or nails 18, if the structure is of wood.

The front wall 10 is cut out as at 19, which forms an opening therein and in which opening the ground glass or translucent panel 20 is seated in a recess 21 so as to be flush with the outer surface of the wall 10. This ground glass is held in the recess in any suitable manner. A resilient elongated clasp 22 is secured at one end by means of a screw or the like 23 above the opening in the front wall and a free end portion extends over one edge portion of the semi-transparent panel 20 and serves to removably secure the transparency T, which is usually placed in a paper or other folded shield S, the latter having opposite registering cut-out portions 24 and 25 which provide a window for the portion of the transparency T that is to be viewed or retouched. This shield S is a conventional one and is used by most retouchers in retouching photographic films. It is understood, however, that with regard to certain transparencies the shield is not necessary and can be dispensed with. The opening 19 that is closed by the translucent or ground glass panel 20 is substantially centrally disposed in the face of the front wall 10. Of course, the dimensions of this opening are subject to increase or decrease, depending upon the particular work to be done.

The removable sides 11 and 12 of the desk are held in place by simple, rotatable latches 26, which are pivotally mounted on a screw or the like 27. Each side 11 and 12 is thus removable in order to gain access to the interior of the desk or cabinet by simply pivoting or rotating the latches 26 on the screw or other fastener 27. One of the sides of the cabinet, in this instance the side 11, is provided with an opening 28 which is in alignment with an opening 29 in a bearing block 30, the latter secured to the inner side of said end 11 by means of nails or screws 31. A reflector carrying shaft 32 extends through the aligned openings 28 and 29 and at one end, 33, the end that projects exteriorly of the wall 11, there is secured a knob K. The other end, 34, of the shaft has mounted thereon an elongated polygonal reflector carrier 35 and this projecting end 34 is frictionally engaged in an opening 36 in the inner end of the reflector carrier 35. Suitable reflectors 37 and 38, which are substantially flat and preferably rectangular in shape, are secured to the reflector carrier 35 by means of removable fasteners 39 of any kind. Each reflector 37 and 38 has different reflective characteristics. While two such reflectors have been shown, it is understood that the reflector carrier 35, while in this instance being shown square in cross section, might be of other polygonal shape and cross section and carry more than two reflectors. Thus a multi-faced reflector rotatably mounted within the desk or cabinet is provided. In order to hold the reflector in any adjusted angular position with respect to the horizontal, a coil spring 40 is disposed concentrically on the shaft 32 and one end of the spring engages the inner end of the reflector carrier 35 and the other end thereof engages the bearing block 30. Suitable elongated strips 41 are secured to the inner walls of the desk and provide a stop or rest for the removable side sections 11 and 12 and each of which sections is provided with a knob 42 to facilitate removal and replacement thereof. It is clear that one of the sections carries therewith the rotatable reflector and is readily removable from the desk or cabinet in order that reflectors having predetermined reflecting characteristics may be easily secured thereto and removed therefrom.

The reflecting media within the cabinet is disposed substantially behind the translucent panel 20. The source of light, in this instance a fluorescent tube 43, suitably held in a metallic or other bracket 44, is disposed within the desk adjacent the top or end 17 and in between the fixed side wall portions 15 and 16 and the bracket is secured to these side wall portions by means of screws or the like 45. This lighting fixture is a conventional one and includes the starter 46 and a transformer 47 that are electrically connected by means of the wires 48, 49, 50 and 51 to the end conductors 52 mounted in the bracket 44. The ends of the wires 50 and 51 are connected with a conventional electrical conductor 53 and the end of which conductor has attached thereto the usual and conventional attachment plug 54 for engagement with any ordinary electrical outlet supply plug or connection. The conductor 53 extends through an opening 55 in the fixed side wall 15. A conventional electric switch 56 also mounted on the fixed end wall 15 is electrically connected with the wiring 50 and 51 and, of course, controls the illumination of the fluorescent or other source of light 43.

While we have mentioned a fluorescent light, it is understood that most any constant source of light might be utilized, such as an electric gas tube, electric hot wire or daylight or colored tubes. The light reflected by either reflector 37 and 38, as denoted by the arrows 57 in Figure 3, from the source of illumination is directed toward the inner side of the translucent panel 20 and, of course, depending upon the angularity of adjustment of the reflector, different intensities of light are thus reflected to the transparent panel and consequently to any transparencies that are mounted on the face or front side of that panel.

The knob 33 is preferably provided with diametrically oppositely disposed pointers 58 which, when the knob and consequently the reflector are rotated, are adapted to indicate the angular disposition of the reflector by means of the graduations 59 and the coinciding numerals 60. Preferably two arcuate sets of graduations and corresponding numerals are utilized, one set of the said graduations and numerals when the desk is disposed as in Figures 1, 2 and 3 with the front 10 at an angle of 60° and the wall 13 provided with a plurality of feet or supports F rests on a supporting surface; and the other set of graduations and corresponding numerals being utilized when the desk is disposed at a 45° angle, see Figure 8, wherein the wall 14 is parallel with a supporting surface and rests on the feet F. In other words, our retouching and viewing desk can be used in two different positions, one where the wall 10 is disposed at a 60° angle and the other where this same wall 10 carrying the semi-transparent panel 20 is disposed at a 45° angle, as in Figures 1 and 8, respectively.

The desk or cabinet has been described as being made of wood but it is understood that the same may be fabricated from metal, plastic or any other suitable material. The reflectors 37 and 38 may be metallic, non-metallic or synthetic and further may be plain, coated or colored and variously shaped. The transparent panel may be of ground glass, opal glass or the like and may be used with or without suitable filters, depending upon the particular work being done.

The interior of the desk or cabinet is preferably coated with a black paint or otherwise rendered substantially non-reflecting.

In view of the foregoing, it is clear that the multi-faced reflector in the cabinet is capable of being rotated 360°. Thus, the selection and use of either of the reflectors within the cabinet is made readily accessible by simply turning the knob K.

We claim:

1. A retouching and viewing desk consisting of a substantially closed cabinet-like structure with connected top, bottom, back, front and side walls, the front wall having an opening therein which is spaced inwardly of the edges thereof, a translucent panel in the opening in the front wall, a fixed source of light in the cabinet adjacent the said top wall and spaced with respect thereto and the panel in the front wall, the said light also being out of alignment with the panel in the front wall, a rotatable reflector in the cabinet, the reflector being mounted on a shaft that extends horizontally into the interior of the cabinet through one of the side walls and has a portion thereof extending exteriorly of the last mentioned wall, and a knob on the extended portion of the shaft exteriorly of the last mentioned wall for manual rotation of the reflector in the cabinet.

2. A retouching and viewing desk consisting of a substantially closed cabinet-like structure with connected top, bottom, back, front and side walls, the front wall having an opening substantially centrally therein, one of said side walls being removable and having an opening therein, a translucent panel in the opening in the front wall, a light fixed in the cabinet adjacent and spaced from the interior of the top wall and also spaced from and out of alignment with the panel in the front wall, a rotatable reflector in the cabinet, the reflector being mounted on a shaft that is carried by and supported on and extends horizontally through the opening in the removable side wall and has an extended portion thereof exteriorly of the removable side wall, and a knob on the extended portion of the shaft exteriorly of the removable side wall for manual rotation of the reflector in the cabinet.

3. A retouching and viewing desk consisting of a substantially closed cabinet-like structure with connected top, bottom, back, front and side walls, the front wall having an opening substantially centrally therein, one of said side walls being removable and having an opening therein, a translucent panel in the opening in the front wall, a light fixed in the cabinet adjacent and spaced from the interior of the top wall and also spaced from and out of alignment with the panel in the front wall, a multi-faced rotatable reflector in the cabinet capable of 360° rotation, the reflector being mounted on a shaft that is carried by and supported on and extends horizontally through the opening in the removable side wall and has an extended portion thereof exteriorly of the removable side wall, and a knob fixed on the extended portion of the shaft exteriorly of the removable side wall for manual 360° rotation of the reflector in the cabinet.

4. A retouching and viewing desk consisting of a substantially closed cabinet-like structure with connected top, bottom, back, front and side walls, the front wall being inclined with respect to the vertical when the cabinet is in one supported position and inclined at a different degree of inclination with respect to the horizontal when the cabinet is in another supported position, the front wall having an opening therein which is spaced inwardly of the edges thereof, a translucent panel in the opening in the front wall, a fixed source of light in the cabinet adjacent the said top wall and spaced with respect thereto and the panel in the front wall, the said light also being out of alignment with the panel in the front wall regardless of the position of the cabinet, a rotatable reflector in the cabinet, the reflector being mounted on a shaft that extends horizontally into the interior of the cabinet through one of the side walls and has a portion thereof extending exteriorly of the last mentioned wall, and a knob fixed to the extended portion of the shaft exteriorly of the last mentioned wall, for manual rotation of the reflector in the cabinet.

5. A retouching and viewing desk consisting of a substantially closed cabinet-like structure with connected top, bottom, back, front and side walls, the front wall being inclined with respect to the vertical when the cabinet is in one supported position and inclined at a different degree of inclination with respect to the horizontal when the cabinet is in another supported position, the front wall having an opening substantially centrally therein, one of said side walls being removable and having an opening therein, a translucent panel in the opening in the front wall, a light fixed in the cabinet adjacent and spaced from the interior of the top wall and also spaced from and out of alignment with the panel in the front wall, a rotatable reflector in the cabinet, the reflector being mounted on a shaft that is carried by and supported on and extends horizontally through the opening in the removable side wall and has an extended portion thereof exteriorly of the removable side wall, and a knob on the extended portion of the shaft exteriorly of the removable side wall for manual rotation of the reflector in the cabinet.

6. A retouching and viewing desk consisting of a substantially closed cabinet-like structure with connected top, bottom, back, front and side walls, the front wall being inclined with respect to the vertical when the cabinet is in one supported position and inclined at a different degree of inclination with respect to the horizontal when the cabinet is in another supported position, the front wall having an opening substantially centrally therein, one of said side walls being removable and having an opening therein, a translucent panel in the opening in the front wall, a light fixed in the cabinet adjacent and spaced from the interior of the top wall and also spaced from and out of alignment with the panel in the front wall, a multi-faced rotatable reflector in the cabinet capable of 360° rotation, the reflector being mounted on a shaft that is carried by and supported on and extends horizontally through the opening in the removable side wall and has an extended portion thereof exteriorly of the removable side wall, and a knob fixed on the extended portion of the shaft exteriorly of the removable side wall for manual 360° rotation of the reflector in the cabinet.

7. A retouching and viewing desk consisting of a substantially closed cabinet-like structure with connected top, bottom, back, front and side walls, the front wall being inclined with respect to the vertical when the cabinet is in one supported position and inclined at a different degree of inclination with respect to the horizontal when the cabinet is in another supported position, the front wall having an opening therein which is spaced inwardly of the edges thereof, a translucent panel in the opening in the front wall, a fixed source of light in the cabinet adjacent the said top wall and spaced with respect thereto and the panel in the front wall, the said light also being out of alignment with the panel in the front wall regardless of the position of the cabinet, a multi-faced rotatable reflector consisting of flat elongated rectangular shaped plates in the cabinet, a reflector carrier polygonal in cross section in the cabinet, the said reflector plates being mounted on opposite faces of the polygonal reflector carrier and presenting oppositely disposed reflecting surfaces, the reflector being capable of 360° rotation, a shaft, the shaft extending horizontally into the interior of the cabinet through one of the side walls and supporting the reflector carrier in the cabinet, the shaft having a portion thereof extending exteriorly of the last mentioned wall, and a knob fixed to the extended portion of the shaft exteriorly of the last mentioned wall for manual 360° rotation of the reflector in the cabinet.

WILLIAM H. HIGHFIELD.
WILLIS D. JOHNSON.

REFERENCES CITED

The following references are of record in the file of this patent:

UNITED STATES PATENTS

| Number | Name | Date |
|---|---|---|
| 125,372 | Zweifel et al. | Apr. 2, 1872 |
| 1,609,316 | Shoemaker | Dec. 7, 1926 |
| 1,895,239 | Venzie | Jan. 24, 1933 |
| 2,165,965 | Gaebel et al. | July 11, 1939 |
| 2,211,376 | Isbell | Aug. 13, 1940 |

FOREIGN PATENTS

| Number | Country | Date |
|---|---|---|
| 2,274 | Great Britain | May 30, 1876 |